United States Patent
Woller, Jr. et al.

(10) Patent No.: US 9,826,746 B2
(45) Date of Patent: Nov. 28, 2017

(54) GAME SHEARS

(71) Applicants: John A. Woller, Jr., Decatur, AL (US);
John A. Woller, Decatur, AL (US);
Ronald R. Woller, Decatur, AL (US)

(72) Inventors: John A. Woller, Jr., Decatur, AL (US);
John A. Woller, Decatur, AL (US);
Ronald R. Woller, Decatur, AL (US)

(73) Assignee: Viking Solutions, LLC, Decatur, AL (US)

( * ) Notice: Subject to any disclaimer, the term of this patent is extended or adjusted under 35 U.S.C. 154(b) by 570 days.

(21) Appl. No.: 14/293,108

(22) Filed: Jun. 2, 2014

(65) Prior Publication Data

US 2014/0357173 A1    Dec. 4, 2014

Related U.S. Application Data

(60) Provisional application No. 61/830,865, filed on Jun. 4, 2013.

(51) Int. Cl.
*A22B 5/00* (2006.01)
*B26B 17/02* (2006.01)

(52) U.S. Cl.
CPC ............ *A22B 5/0047* (2013.01); *B26B 17/02* (2013.01)

(58) Field of Classification Search
CPC ....... A22B 5/00; A22B 5/0017; A22B 5/0023; A22B 5/0035; A22B 5/0047; A22B 5/20
USPC .......................................... 452/1–6, 120, 103
See application file for complete search history.

(56) References Cited

U.S. PATENT DOCUMENTS

| | | | | |
|---|---|---|---|---|
| 4,462,157 A * | 7/1984 | Aiken | ..................... | B26B 13/26 30/224 |
| 5,743,018 A * | 4/1998 | Wang | ................... | A01G 3/0251 30/231 |
| 5,839,195 A * | 11/1998 | Lin | ....................... | A01G 3/0251 30/249 |
| 6,000,307 A * | 12/1999 | Aamodt | .................. | B26B 17/02 30/190 |
| 6,503,137 B2 * | 1/2003 | Maille | .................. | A47G 21/061 30/120.1 |
| 7,434,497 B2 * | 10/2008 | Caravello | ................. | B25B 7/16 81/364 |
| 7,527,549 B1 * | 5/2009 | Goodman | ............ | A22C 29/024 452/102 |

* cited by examiner

*Primary Examiner* — Richard Price, Jr.
(74) *Attorney, Agent, or Firm* — Jeremy A. Smith; Frank M. Caprio; Bradley Arant Boult Cummings LLP (57) ABSTRACT

The game shears 10 of the present disclosure comprise an upper arm 20, a lower arm 30, a linkage 40 and a blade 50. The upper arm 20 and lower arm 30 act as levers which move the game shears 10 from a first closed configuration to a second open configuration. The upper arm 20 and lower arm 30 are engaged with one another, the upper arm 20 is also engaged with the blade 50 via the linkage 40 and the lower arm 30 is directly engaged with the blade 50.

14 Claims, 8 Drawing Sheets

GAME SHEARS

CROSS REFERENCE TO RELATED APPLICATIONS

This application claims priority to, and the benefit of, U.S. Provisional Application Ser. No. 61/830,865 filed on Jun. 4, 2013 titled "Game Shears."

FIELD OF THE DISCLOSURE

The present disclosure relates to a device for processing wild game. More specifically, the present disclosure relates to game shears.

BACKGROUND

Game shears are well known in the art. Typically, game shears mimic standard scissors in design and prior art shears simply increased the size of the handles and blades in an attempt to accommodate the stresses encountered when processing game after harvest (i.e., "field dressing"). However, prior art game shears did not provide enough leverage to safely cut through bone or other anatomical structures inside of the game being processed and required that the operator place his or her hands inside of the animal's body cavity to operate the shears. Due to the limitations of prior art shears, some hunters resort to using large knives or even saws or hatchets to field dress animals. Knives and saws suffer from the same limitations as the prior art shears and are generally unsafe as well. Accordingly, there is a need for game shears that allow sufficient leverage to be applied to the cutting blade to cut through the bone and other anatomical structures of game animals, such as deer, and that allow the operator to keep his or her hands outside of the body cavity during processing. Such game shears are disclosed herein.

BRIEF DESCRIPTION OF THE DRAWINGS

To further describe advantages and features of the present disclosure, a more particular description of the invention will be rendered by reference to specific embodiments thereof which are illustrated in the appended drawings. The drawings are not necessarily to scale, emphasis instead being placed upon illustrating the principles of the invention. It is to be appreciated that these drawings are not to be considered limiting in scope. The invention will be described and explained with additional specificity and detail through the use of the accompanying drawings in which.

SUMMARY

In one aspect, the present disclosure provides a game shear 10 comprising an upper arm 20, a lower 30, a linkage 40 and a blade 50.

DETAILED DESCRIPTION

The present invention is depicted in FIGS. 1-14. Turning to FIGS. 1-6, the game shears 10 generally comprise an upper arm 20, a lower arm 30, a linkage 40 and a blade 50. As shown in FIGS. 1-6 and described in detail below, the upper arm 20 and lower arm 30 act as levers which move the game shears 10 from a first closed configuration (as shown in detail in FIG. 3) to a second open configuration (as shown in detail in FIG. 6). The upper arm 20 and lower arm 30 are engaged with one another, the upper arm 20 is also engaged with the blade 50 via the linkage 40 and the lower arm 30 is directly engaged with the blade 50. In one embodiment, the latitudinal axis of the upper arm 20 is rotated ninety (90) degrees relative the lower arm 30.

The game shears 10 are easy to use, an especially important feature in the field. To use the game shears 10, one moves the upper arm 20 upwardly and away from the lower arm 30 thus transitioning the game shears 10 from the closed configuration to the open configuration and exposing a cutting edge 52 of the blade 50. Next, the blade 50 is placed within the body cavity of the animal to be processed. Then, while applying pressure to bring the upper arm 20 and lower arm 30 back together, one pulls the game shear 10 in the same general direction as the cut is to be made in normal use, the upper arm 20 and lower arm 30 are operated in a manner similar to a pair of scissors while at the same time the hunter pulls the game shear 10 towards his or her body). One novel aspect of the game shears 10 of the current disclosure is that the direction of the cut made by the game shears is towards, rather than away from the user. Through the dual action of bringing the upper arm 20 and lower arm 30 together again and pulling the game shears 10 in the same general direction as the cut is to be made, bone and other anatomical structures of the animal being processed can be cut and/or removed. Now, turning again to FIGS. 1-6 and FIGS. 7-14, each element of the game shears 10 will be discussed in detail.

As shown in FIGS. 1-8, the upper arm 20 comprises an upper arm handle 22, an upper arm extension 24 and an upper arm connector 26. The upper arm handle 22 is distal the linkage 40 and blade 50 and is in a first orientation relative the lower handle 30. Typically, the upper arm handle 22 is configured to allow one to grasp and operate the game shears 10 as disclosed above. The size and shape of the upper arm handle 22 may vary depending upon many factors, including without limitation the overall length of the game shears 10 and ergonomic concerns. Additionally, the upper arm 20 may comprise a plurality of holes to lessen the weight of the games shears 10. Further, in one embodiment, the upper arm extension 24 is disposed at an angle relative to the upper arm handle 22 and the upper arm connector 26 wherein the upper arm handle 22 is positioned above the upper arm connector 26.

Figure 1:
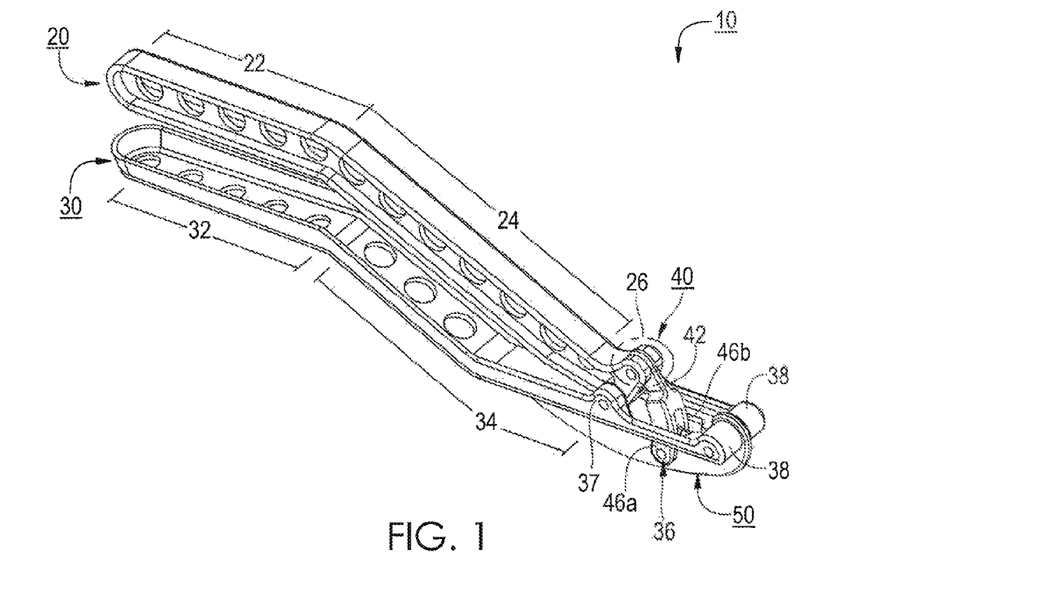
FIG. 1 depicts a perspective view of one embodiment of the game shears 10 disclosed herein in the closed configuration.
Figure 2:
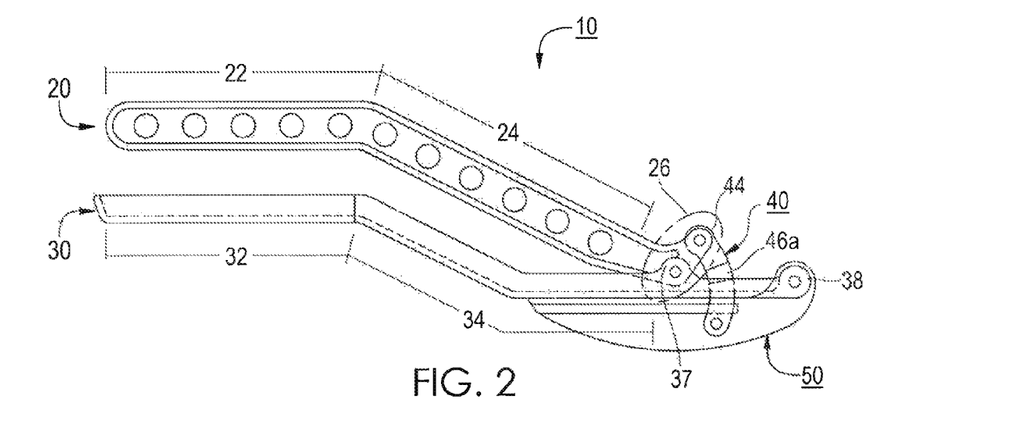
FIG. 2 depicts a side view of one embodiment of the game shears 10 disclosed herein in the closed configuration.
Figure 3:
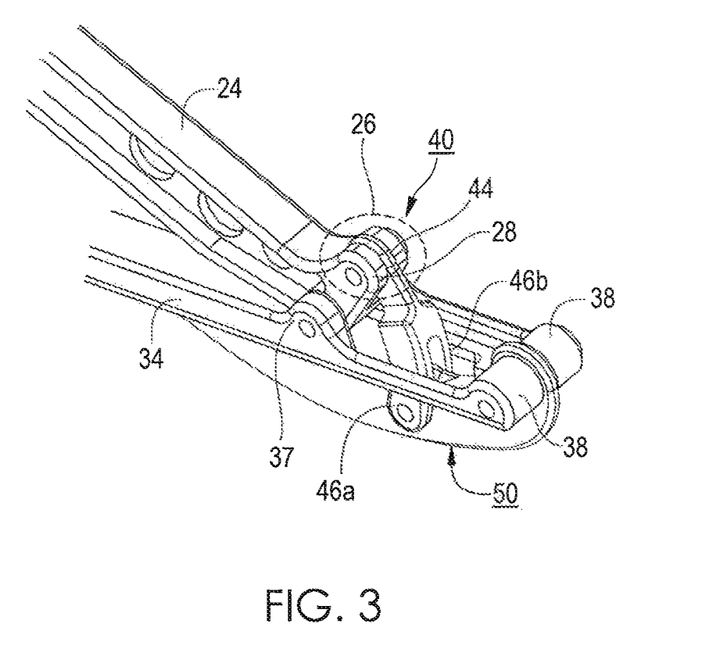
FIG. 3 depicts a close up side view of one embodiment of the game shears 10 disclosed herein in the closed configuration.
Figures 4, 5:
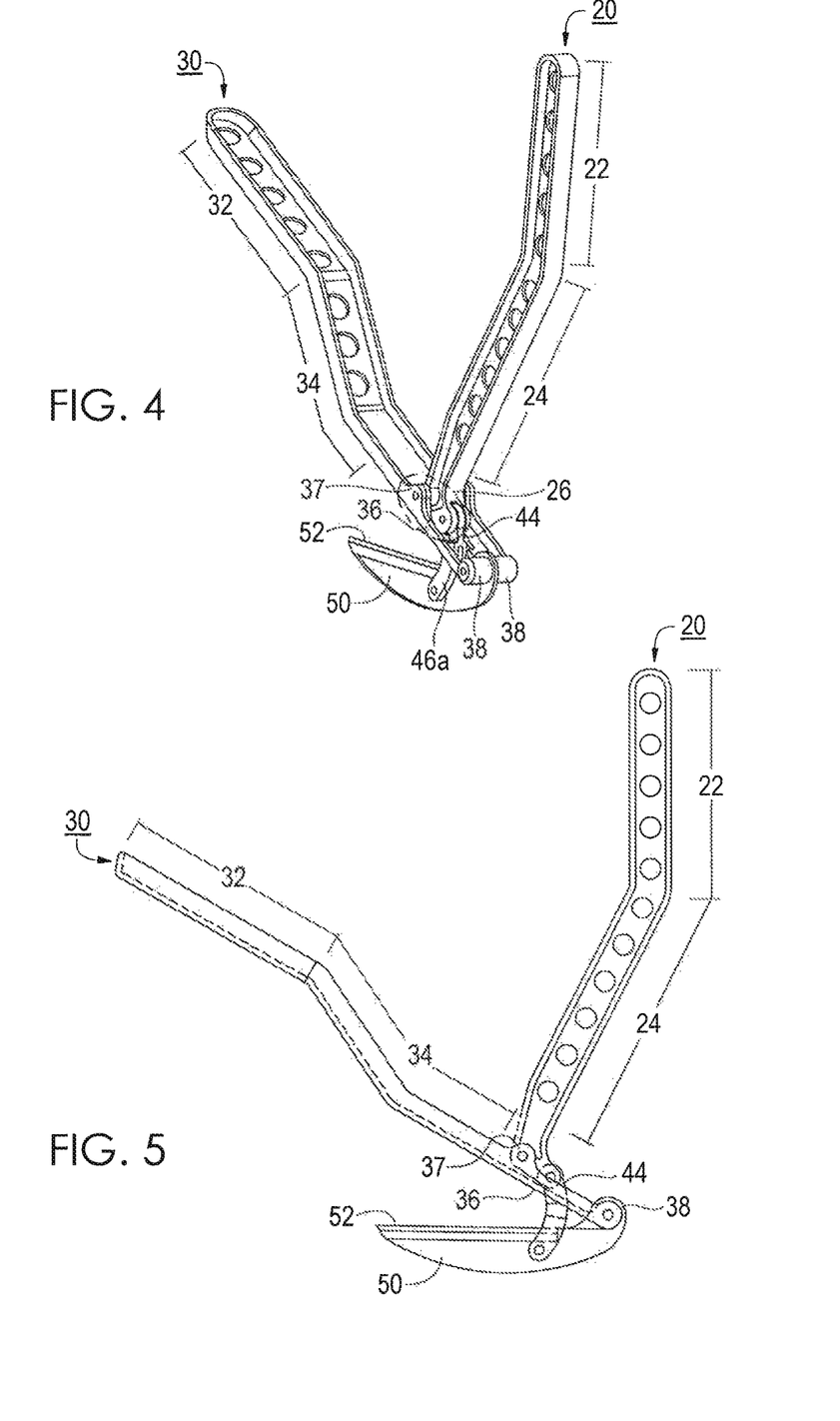
FIG. 4 depicts a perspective view of one embodiment of the game shears 10 disclosed herein in the open configuration.
FIG. 5 depicts a side view of one embodiment of the game shears 10 disclosed herein in the open configuration.
Figure 6:
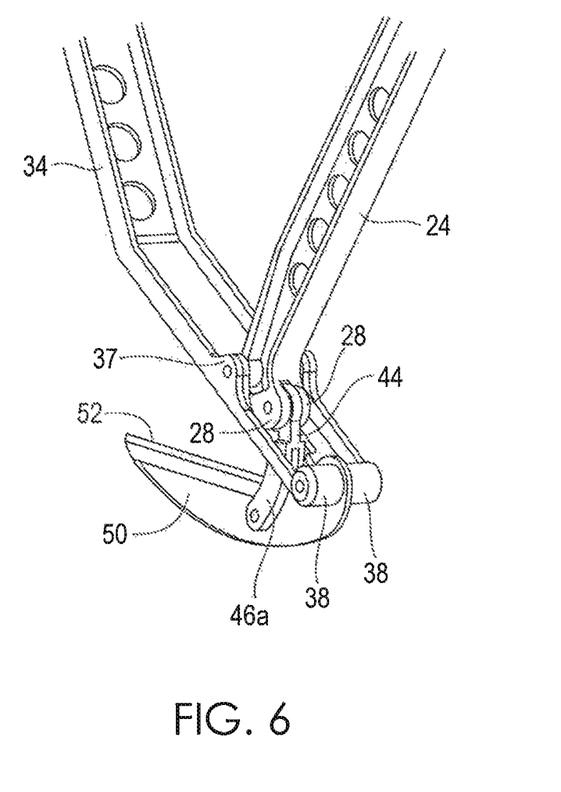
FIG. 6 depicts a close up side view of one embodiment of the game shears 10 disclosed herein in the open configuration.
Figure 7:
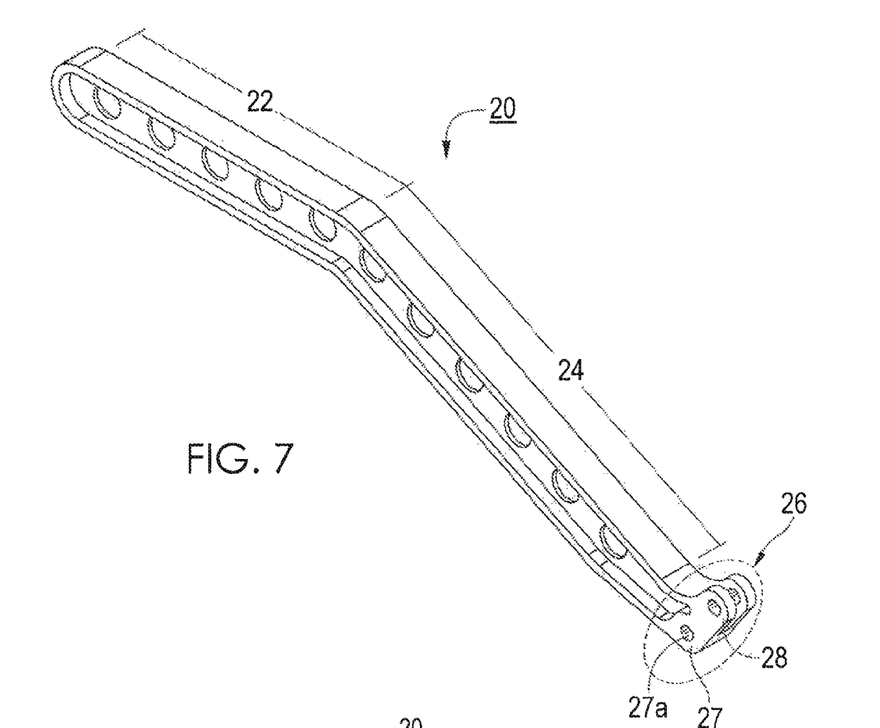
FIG. 7 depicts a perspective view of one embodiment of the upper arm 20 of the game shears 10 disclosed herein.
Figure 8:
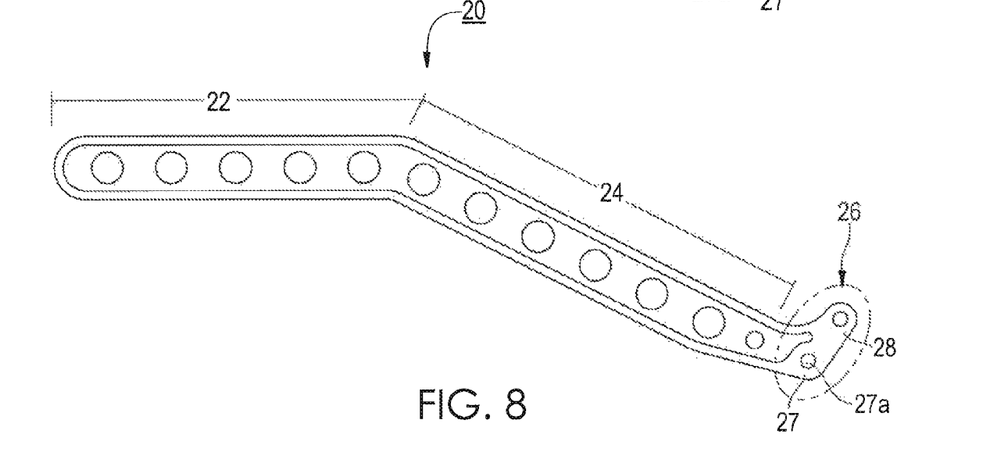
FIG. 8 depicts a side view of one embodiment of the upper arm 20 of the game shears 10 disclosed herein.

The upper arm extension 24 spans the distance between the upper arm handle 22 and the upper arm connector 26. The upper arm extension 24 may be of varying lengths; however, generally the longer the length of the upper arm extension 24, the more leverage may be applied to the blade 50.

The upper arm connector 26 is located distal the upper arm handle 22. The upper arm connector 26 comprises a lower arm engagement point 27 and a linkage engagement point 28. The lower arm engagement point 27, in one embodiment, comprises a region that is narrower than the width of the remaining length of the upper arm 20 and a hole 27a through which it engages the lower arm's 30 upper arm engagement point 37. The linkage engagement point 28 comprises two (2) tabs through which the upper arm engagement point 44 of the linkage 40 is positioned. Thus, the upper arm connector 26 engages the upper arm 20 with both the lower arm 30 and the linkage 40. The upper arm 20 may be attached to the lower arm 30 and the linkage 40 via any acceptable fastening means known to one of ordinary skill in the art including without limitation bolts and pins.

Now referring to FIGS. 1-6 and 9-10, the lower arm 30 comprises a lower arm handle 32, a lower arm extension 34 and lower arm connector 36. The lower arm handle 32 is located distal the linkage 40 and blade 50 and, in one embodiment, is in a second orientation relative the upper handle 20. Typically, the lower arm handle 32 is configured to allow one to grasp and operate the game shears 10 as disclosed above. Additionally, the lower arm 30 may comprise a plurality of holes to lessen the weight of the games shears 10. The size and shape of the lower arm handle 32 may vary depending upon many factors, including without limitation the overall length of the game shears 10 and ergonomic concerns.

Figure 9:
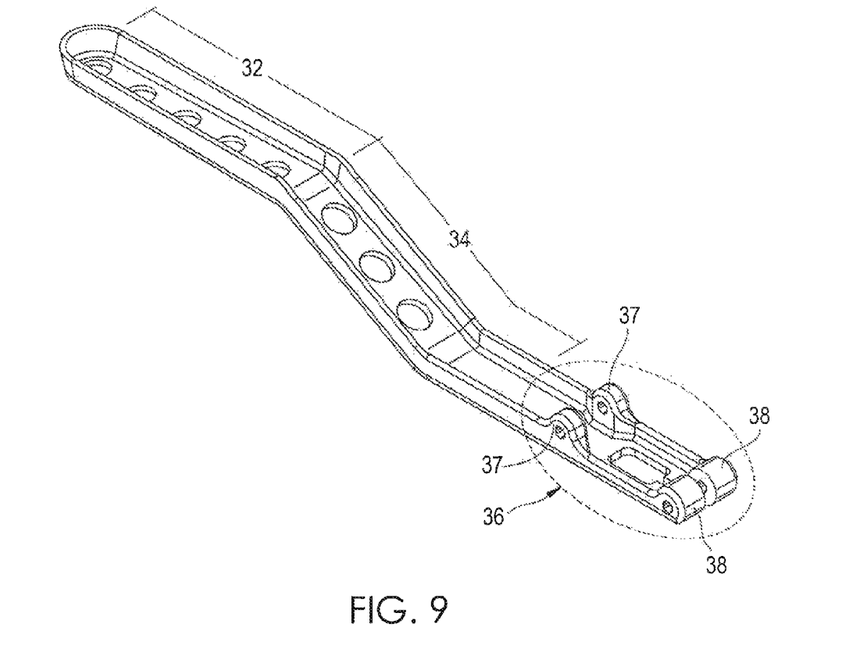
FIG. 9 depicts a perspective view of one embodiment of the lower arm 30 of the game shears 10 disclosed herein.
Figure 10:
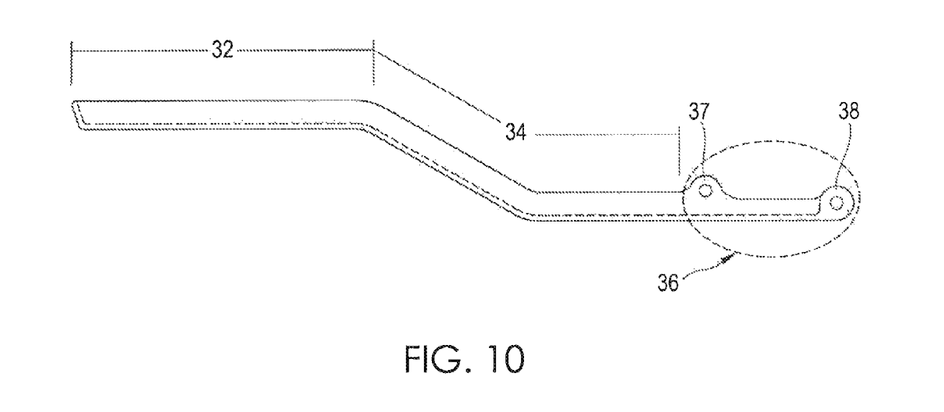
FIG. 10 depicts a side view of one embodiment of the lower arm 30 of the game shears 10 disclosed herein.

The lower arm extension 34 spans the distance between the lower arm handle 32 and the lower arm connector 36. The lower arm extension 34 may be of varying lengths; however, generally the longer the length of the lower arm extension 34 the more leverage may be applied to the blade 50. In one embodiment, the lower arm extension 34 is disposed at an angle relative to the lower arm handle 32 and the lower arm connector 36 wherein the lower arm handle 32 is positioned above the lower arm connector 36.

The lower arm connector 36 is located distal the lower arm handle 32. The lower arm connector 36 comprises an upper arm engagement point 37 and a blade engagement point 38. The upper arm engagement point 37, in one embodiment, comprises two (2) tabs located on opposite sides of the lower arm 30 and a hole 37a. The lower arm engagement point 27 of the upper arm 20 is disposed between the two (2) tabs and a fastening means is placed into the holes 37a and 27a to attach the upper arm 20 to the lower arm 30. The blade engagement point 38 comprises an elongate structure, which in one embodiment is narrower than the other portions of the lower arm 30 and a hole 38a wherein the elongated structure is configured to be disposed between the tabs of the lower arm engagement point 54 of the blade 50 (as described below). Thus, the lower arm connector 36 engages the lower arm 30 with both the upper arm 20 and the blade 50. The lower arm 30 is attached to the upper arm 20 and the blade 50 via any acceptable fastening means known to one of ordinary skill in the art inducing without limitation bolts and pins.

As shown in FIGS. 1-6 and 11-12, the game shears 10 further comprise a linkage 40 that connects the upper arm 20 to the blade 50. In one embodiment, the linkage 40 comprises a central body 42, an upper arm engagement point 44 located on one end of the central body 42 and a blade engagement point 46 on the opposite end of the central body 42. In one embodiment, the linkage 40 is in the shape of an arc which facilitates the movement of the upper arm 20, lower arm 30 and the blade 50.

Figure 11:
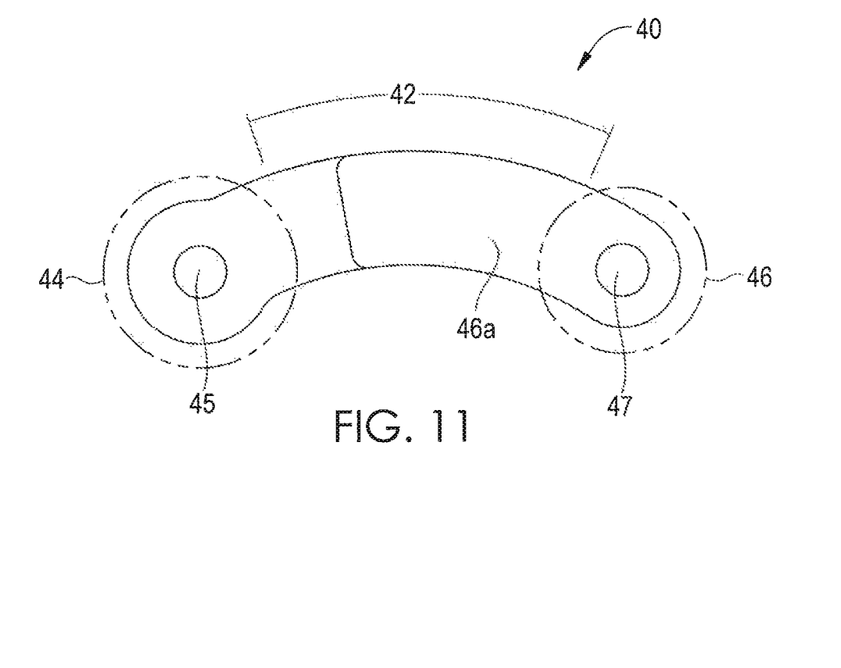
FIG. 11 depicts a side view of one embodiment of the linkage 40 of the game shears 10 disclosed herein.
Figure 12:
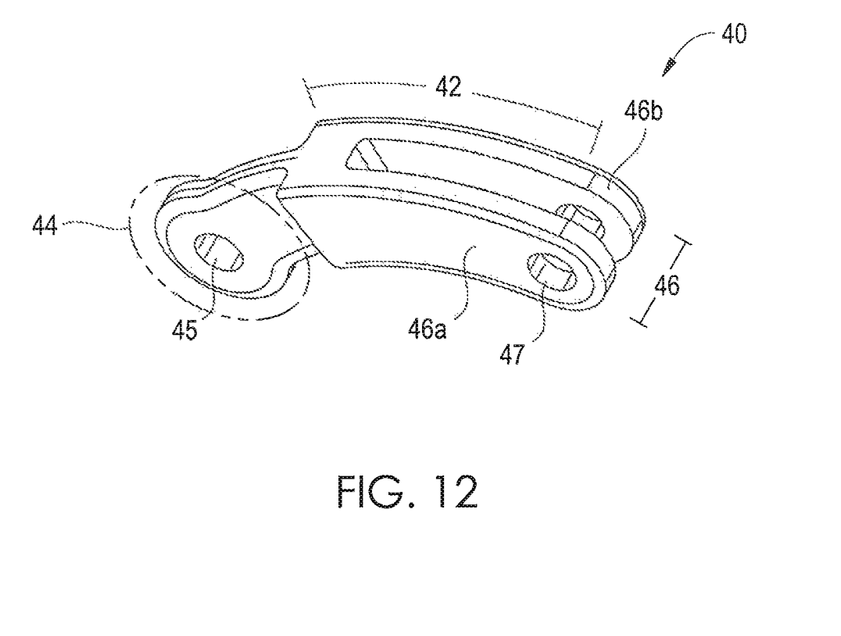
FIG. 12 depicts a perspective view of one embodiment of the linkage 40 of the game shears 10 disclosed herein.

The upper arm engagement point 44 is an elongate structure comprising a hole 45. The upper arm engagement point is configured to be disposed between the two (2) tabs of the upper arm's 20 linkage engagement point 27. After the holes 45 and 28b are aligned, a fastening means such as a pin or a bolt are inserted through the holes thereby securing the linkage 40 to the upper arm.

The blade engagement point 46, in one embodiment, comprises two (2) tabs 46a, 46b through which the blade 50 is disposed and a hole 47. Once again, any fastening means known to one of ordinary skill in the art may be used to secure the linkage 40 to the blade 50.

The linkage 40 operates to transfer the force created by the movement of the upper arm 20 to the blade 50. Generally, in one embodiment, as the upper arm 20 is lifted from the closed configuration to the open configuration, the linkage 40 moves in a downward manner thus causing the blade 50 to transition to the open configuration. Then, as the upper arm 20 is lowered from the open configuration to the closed configuration, the linkage 40 moves in an upward direction thereby causing the blade 50 to transition to the closed configuration. In one embodiment, as the linkage 40 moves during the transition from the open to the closed configuration, it passes through an opening on the lower arm 30.

The game shears 10 further comprise a blade 50 as shown in FIGS. 1-6 and 13-14. The blade 50 further comprises a cutting edge 52, an opening 54 and a lower arm connection point 56. The cutting edge 52 is located proximate the lower arm 30. During the operation of the game shear 10 (as described herein), the blade 50 transitions from the closed configuration to the open configuration. In the closed configuration, the cutting edge 52 may rest against the flat surface of the lower arm 30. During the transition from the closed configuration to the open configuration, the cutting edge 52 moves away from the flat surface of the lower arm 30. The bone or other anatomical structure to be cut is then placed between the cutting edge 52 and the lower arm's 30 flat surface. As the game shears 10 transitions from the open configuration to the closed configuration, the cutting edge 52 engages the bone or other anatomical material thereby cutting it (in a manner similar to a meat cleaver cutting meat on a chopping block).

Figure 13:
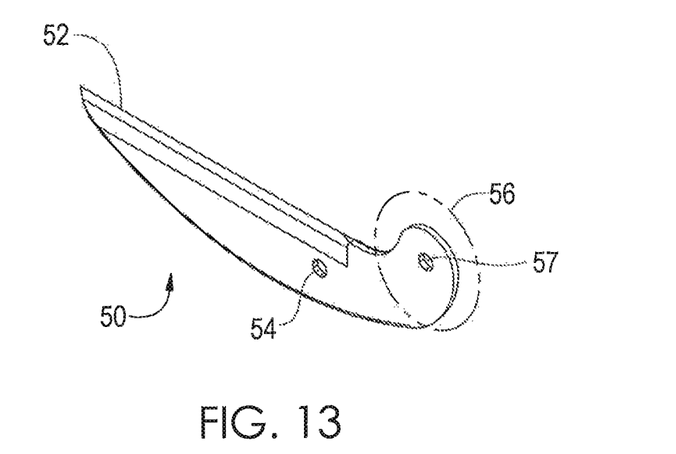
FIG. 13 depicts a perspective view of one embodiment of the blade 50 of the game shears 10 disclosed herein.
Figure 14:
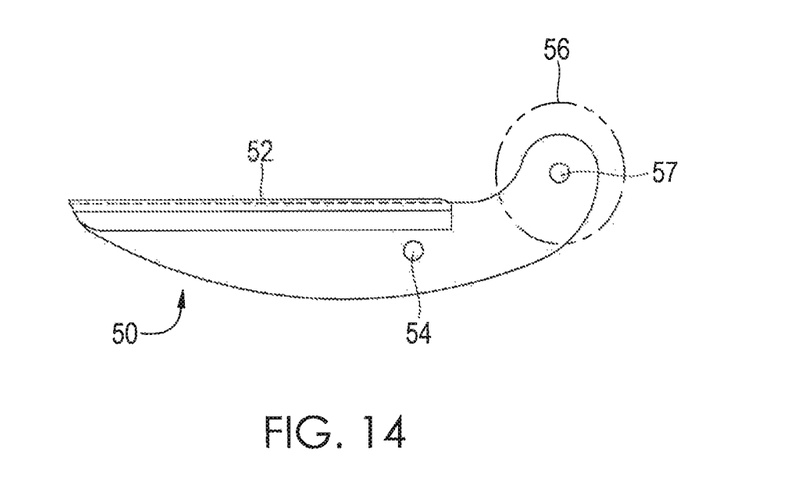
FIG. 14 depicts a side view of one embodiment of the blade 50 of the game shears 10 disclosed herein.

The blade 50 is in engagement with the linkage 40 and the lower 30. The blade 50 engages the linkage 40 via the linkage's 40 blade engagement point 46. Generally, the two (2) tabs of the blade engagement point 46 are disposed on either side of the blade 50 and are aligned with opening 54. Once aligned, any fastening means known to one of ordinary skill in the art may be used to connect the blade 50 to the linkage 40. The blade's lower arm engagement point 56 is an elongate structure configured to be displaced between the two (2) tabs of the lower arm's 30 blade engagement point

38. Using the hole 38*b* and 57, the blade 50 is fastened to the lower arm 30 using any fastening means known to one of ordinary skill in the art.

The game shears 10 of the present disclosure provide many improvements over the prior art, including without limitation:

Eliminating the need to place one's hands inside of the body cavity of the animal being processed to cut through various bone an anatomical structures;

Creating more leverage and force to make cutting through various bone and anatomical structures easier and safer; and Allowing for more efficient field processing of animals.

While the invention has been described with respect to a limited number of embodiments, those skilled in the art, having benefit of this disclosure, will appreciate that other embodiments can be devised which do not depart from the scope of the invention as disclosed here.

We claim:

1. Game shears comprising:
   a. an upper arm engaged with a lower arm, the lower arm also being directly engaged with a blade, said blade further comprising a cutting edge disposed below the lower arm; and
   b. a non-linear linkage engaged with the blade and the upper arm; wherein the upper arm and the lower arm are movable from a first closed configuration to a second open configuration.

2. The game shears of claim 1 wherein the linkage comprises a upper arm engagement point configured to engage the upper arm and a blade engagement point configured to engage the blade, wherein the upper arm engagement point and the blade engagement point are located on opposite ends of the linkage.

3. The game shears of claim 2 wherein the linkage is in the shape of an arc.

4. The game shears of claim 3 wherein the lower arm comprises a flat surface located on a bottom surface, wherein the flat surface engages the blade's cutting edge when the game shears are in the closed configuration.

5. The game shears of claim 4 wherein the upper arm further comprises a upper arm handle, a upper arm extension and a upper arm connector, wherein the upper arm extension spans a distance between the upper arm handle and the upper arm connector and wherein the upper arm extension is disposed at an angle relative to the upper arm handle and the upper arm connector such that the upper arm handle is positioned above the upper arm connector.

6. The game shears of claim 5 wherein the lower arm further comprises a lower arm handle, a lower arm extension and a lower arm connector, wherein the lower arm extension spans a distance between the lower arm handle and the lower arm connector and wherein the lower arm extension is disposed at an angle relative to the lower arm handle and the lower arm connector such that the lower arm handle is positioned above the lower arm connector.

7. Game shears comprising a upper arm, a lower arm, a curved linkage and a blade, wherein (i) the upper arm and lower arm are pivotally engaged with one another, (ii) the linkage is engaged with the upper arm and passes through an opening on the lower arm to engage the blade and (iii) the lower arm is directly engaged with the blade.

8. The game shears of claim 7 wherein a widest surface of the upper arm is perpendicular to a widest surface of the lower arm.

9. The game shears of claim 8 wherein the linkage comprises a upper arm engagement point and a blade engagement point, wherein the upper arm engagement point and the blade engagement point are located on opposite ends of the linkage.

10. The game shears of claim 9 wherein the linkage is in the shape of an arc.

11. The game shears of claim 10 wherein the lower arm comprises a flat surface located on a bottom surface, wherein the flat surface contacts a cutting edge of the blade when the game shears are in a closed configuration.

12. The game shears of claim 11 wherein the upper arm further comprises a upper arm handle, a upper arm extension and a upper arm connector, wherein the upper arm extension spans a distance between the upper arm handle and the upper arm connector and wherein the upper arm extension is disposed at an angle relative to the upper arm handle and the upper arm connector such that the upper arm handle is positioned above the upper arm connector.

13. The game shears of claim 12 wherein the upper arm connector comprises a lower arm engagement point and a linkage engagement point.

14. The game shears of claim 11 wherein the lower arm further comprises a lower arm handle, a lower arm extension and a lower arm connector, wherein the lower arm extension spans a distance between the lower arm handle and the lower arm connector and wherein the lower arm extension is disposed at an angle relative to the lower arm handle and the lower arm connector such that the lower arm handle is positioned above the lower arm connector.

* * * * *